Dec. 22, 1931. H. A. HADLEY 1,837,864
FABRIC TESTING MACHINE
Filed Feb. 18, 1928 2 Sheets-Sheet 1
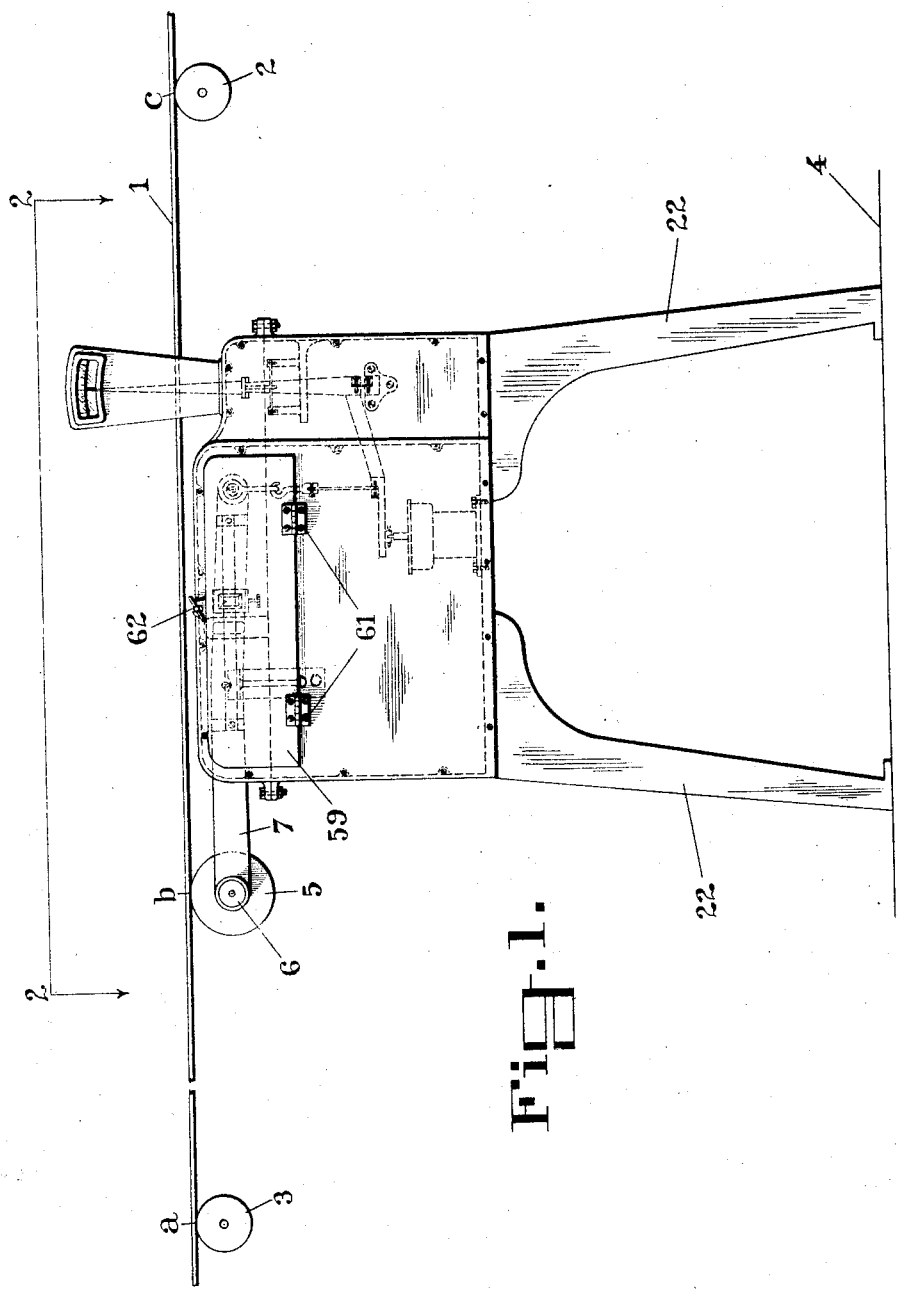
INVENTOR
*Harlan A. Hadley*
BY
*Henry Sherman*
ATTORNEY Dec. 22, 1931.   H. A. HADLEY   1,837,864
FABRIC TESTING MACHINE
Filed Feb. 18, 1928    2 Sheets-Sheet 2
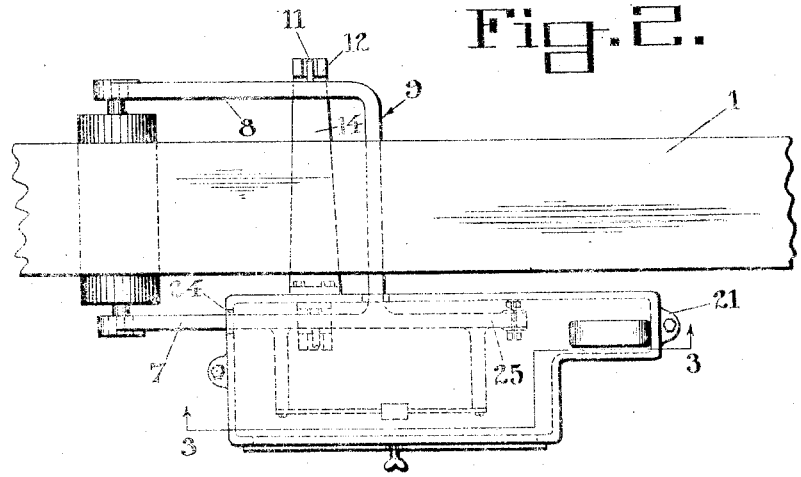
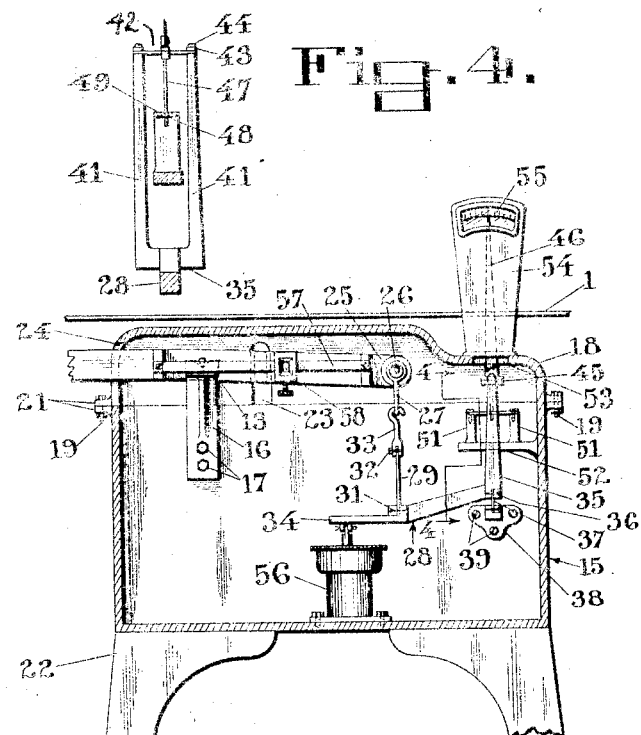
INVENTOR
Harlan A. Hadley
BY
Henry Sherman
ATTORNEY Patented Dec. 22, 1931

1,837,864

UNITED STATES PATENT OFFICE

HARLAN A. HADLEY, OF ST. JOHNSBURY, VERMONT, ASSIGNOR TO E. AND T. FAIRBANKS AND COMPANY, OF ST. JOHNSBURY, VERMONT, A CORPORATION OF VERMONT

FABRIC TESTING MACHINE

Application filed February 18, 1928. Serial No. 255,446.

This invention relates to improvements in devices for testing the weight of a unit length of continuously moving webs of flexible material and more particularly to devices for testing the weight or thickness of a web of fabric as it issues from a coating machine. There is usually provided in machines for coating fabric, or other material, means for increasing or decreasing the weight or thickness of the layer being deposited upon the material. It has been a source of great difficulty to detect slight variations in the weight or thickness of the coated material until a considerable length has been produced. This obviously results in a considerable loss. Accordingly it is an object of this invention to provide a testing device which is simple, durable and compact in construction and extremely sensitive in operation.

Another object of this invention is the provision of an improved indicator lever construction which is extremely simple in design and accurate in performance.

Other objects of this invention, together with certain details of construction and combination of parts will be more particularly described by reference to the accompanying drawings and pointed out in the appended claims.

In the accompanying drawings:

Figure 1 is an elevational view of the device embodying the invention, showing a length of fabric in position to be tested;

Figure 2 is a plan view of the device taken on line 2—2 in Figure 1;

Figure 3 is a side elevational view of the device with part of the main lever broken away, taken on line 3—3 in Figure 2; and Figure 4 is a detail view showing the means for fulcruming the indicator, taken on line 4—4 in Figure 3.

Similar characters of reference indicate corresponding parts throughout the several views.

Referring to the drawings wherein the preferred embodiment of the invention is set forth, there is shown a web 1 as it is being delivered from a calendering machine (not shown) wherein the web had been given a coating of any suitable substance. From the machine the web passes over two idler rollers 2 and 3 which may be supported on a floor, or base 4 by any suitable means. Located midway between the idler rollers is a scale roller 5 which is journalled in antifriction bearings 6 carried in the extremities of a pair of arms 7 and 8 of U-shaped lever, said lever being generally indicated by reference numeral 9.

In each arm of the U-shaped lever, adjacent to the base thereof, is inserted a knifeedge pivot 11. These pivots are fulcrumed in bearings 12 and 13. The bearing 12 is set in the free end of a substantially L-shaped bracket member 14 which is suitably attached to a housing 15. The bearing 13 is set in the extremity of a bracket member 16 fixed to the inside of the housing by means of bolts 17.

The housing 15 is substantially box-like in construction and has a cover portion 18 which is removable in order to facilitate the assembling of the device. After the device is assembled, the housing and its cover may be securely fastened together by means of bolts 19 extending through apertured ears 21 integral with said housing and cover. The housing is supported on standards 22 of a suitable height. The housing cover 18 has longitudinal slots 23 and 24 extending vertically thereof which, when the cover is clamped on the housing proper, form openings through which the main lever 9 extends and in which it is free to oscillate.

The arm 7 of the U-shaped main lever 9 is extended beyond the base of said lever and in the extremity of this extension 25 is carried a knife-edge pivot 26 on which is pivoted a loop 27. The main lever 9 is connected to an intermediate load transmitting lever 28 through the medium of a flexible tape 29, clamped at 31 to the indicator lever and at 32 to a hook 33 which is pivoted in the loop 27. The intermediate load transmitting lever comprises an arm 34 having a bifurcated, or U-shaped, member 35 integral therewith and at an angle thereto. The intermediate load transmitting lever is fulcrumed substantially at the apex 36 formed by the members 34 and 35 by means of a plate fulcrum 37 clamped to the lever 28 and to a bracket 38 suitably attached to the inside of the housing, as by screws 39.

Mounted between the upright arms 41 of the U-shaped member 35 is a torsion ribbon, or strip, 42 which is tightly strung between said arms and is securely clamped in position by means of clips 43 and screws 44. Substantially centrally of the ribbon 42 is rigidly attached an indicator mounting 45 to which is suitably fastened an indicator 46.

Depending from the indicator mounting is a guide pin 47 which is adapted to extend through a slot 48 extending transversely of a guide plate 49 suitably attached to the extremities of posts 51 formed integral with a shelf 52 suitably attached to the housing. The construction outlined above provides a floating fulcrum for the indicator and is substantially similar to the construction disclosed in my co-pending application, Serial No. 234,716 filed November 21, 1927.

The indicator 46 extends through an opening 53 into an indicator housing 54 in the upper portion of which is fixed a chart 55 with which the indicator cooperates.

The intermediate load transmitting lever is provided with means for cushioning its movements and to this end a dash pot 56 is operatively connected to arm 34 of the indicator lever.

In order that materials of widely varying weights or thicknesses may be tested by the same testing device, the main lever is provided with a beam 57 on which is slidably mounted a poise 58 which is adapted to be moved to a position on the beam where the weight on the roller 5 is counterbalanced. To make the beam and poise accessible, an opening is provided, which opening is closed by means of a cover 59 hinged to the housing at 61. This cover is latched at 62. To prevent any tampering with the poise, a locking arrangement may be provided. The construction of the main lever 9 is such that when the poise 58 is at the zero mark on the beam 57 the lever is evenly balanced and the indicator will point to the zero mark on the chart.

In operation, a web of material 1 is positioned on rollers 2, 3 and 5 and the poise is moved along the beam until the indicator points to zero on the chart 55, assuming that the coated material is of the required weight. The rollers 2, 3 and 5 are tangent to the same horizontal plane at the point $a$, $b$, and $c$ when the indicator points to the zero mark on the chart. Any increase or decrease in the weight or thickness of the web of material will be indicated by the indicator moving away from the zero mark on the chart and the necessary adjustments of the calendering machine, etc. may be immediately made by the operator to cause the material to be given the proper or required weight.

Having thus described my invention, what I claim as new and desire to secure by Letters Patent of the United States, is:

1. In a device of the character described, the combination with means to support a moving web of material comprising a U-shaped main lever, of indicating means, intermediate load transmitting means connected to said main lever, said intermediate load transmitting means including a body portion and opposed, operative arms disposed at an angle to the said body portion and connected to the said indicating means.

2. In a device of the character described, the combination with means for supporting a moving web of material comprising a U-shaped main lever, of indicating means, intermediate load transmitting means connected to said main lever, and intermediate load transmitting means comprising a lever formed of extended operative arms disposed at an angle to each other, one of said arms being bifurcated and cooperating with the said indicating means.

3. In a device of the character described, the combination with a means for supporting a moving web of material comprising a U-shaped lever, of indicating means connected to said lever, an intermediate load transmitting angular lever having a bifurcated arm, a torsion ribbon bridging said bifurcation, an indicator on said ribbon and a chart with which said indicator cooperates.

4. In a device of the character described, the combination with a means for supporting a moving web of material, of indicating means connected thereto, an intermediate load transmitting angular lever having a bifurcated arm, a torsion ribbon bridging said bifurcation, an indicator fulcrumed on said ribbon, a guide plate for said indicator, and a chart with which said indicator cooperates.

5. In a device of the character described, the combination with means for supporting a moving web of material, of indicating means connected to said supporting means, intermediate load transmitting means comprising an angular lever and co-operating with the said indicating means, and means for fulcruming the said lever.

6. In a device of the character described, the combination with means for supporting a moving web of material, of indicating means connected thereto, an intermediate load transmitting means connected to the indicating means, said intermediate load transmitting means comprising an angular lever co-operating with the said indicating means, and means for fulcruming the said angular lever comprising a flexible plate.

7. In a device of the character described, the combination with means for supporting a moving web of material including a U-shaped main lever, of indicating means connected to said lever, an intermediate load transmitting means comprising an angular lever co-operating with the said indicating means, and means for fulcruming the said angular lever comprising a flexible plate and a bracket in which one end of said plate is fixed.

8. In a device of the character described, the combination with a means for supporting a moving web of material including a U-shaped main lever, of indicating means connected to said lever, an intermediate load transmitting means comprising a lever having two sectional arms at an angle to each other end co-operating with the said indicating means, means for fulcruming the said lever, and damping means attached to one of the arms of the said intermediate load transmitting lever.

9. In a device of the character described, the combination with means for supporting a moving web of material including a U-shaped lever, of indicating means connected to said lever, an intermediate load transmitting lever having a pair of arms at an angle to each other, an indicator carried by one of said arms and a dashpot connected to the other of said arms.

10. In a device of the character described, the combination with a means for supporting a moving web of material includng a U-shaped lever, of indicating means flexibly connected to said lever, an intermediate load transmitting angular lever having an indicator attached thereto, and damping means also adapted to be connected to said angular lever.

In testimony whereof I have hereunto set my name to this specification.

HARLAN A. HADLEY.